US006657538B1

(12) United States Patent
Ritter

(10) Patent No.: US 6,657,538 B1
(45) Date of Patent: Dec. 2, 2003

(54) METHOD, SYSTEM AND DEVICES FOR AUTHENTICATING PERSONS

(75) Inventor: Rudolf Ritter, Zollikofen (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/402,054

(22) PCT Filed: Nov. 7, 1997

(86) PCT No.: PCT/CH97/00424

§ 371 (c)(1),
(2), (4) Date: Sep. 28, 1999

(87) PCT Pub. No.: WO99/24938

PCT Pub. Date: May 20, 1999

(51) Int. Cl.[7] ............................................. G05B 19/00
(52) U.S. Cl. .................. 340/5.81; 340/5.8; 340/5.83; 340/5.82; 340/5.84; 340/5.85; 382/116; 382/118; 380/247; 455/410; 455/411; 713/186
(58) Field of Search ................. 340/5.81, 5.83, 340/5.8, 5.82, 5.84, 5.85; 382/115, 118; 380/247; 455/410, 411; 713/186; 705/44

(56) References Cited

U.S. PATENT DOCUMENTS

| 5,131,038 | A | | 7/1992 | Puhl |
| 5,420,908 | A | | 5/1995 | Hodges |
| 5,838,812 | A | * | 11/1998 | Pare, Jr. et al. ............. 382/115 |
| 6,016,476 | A | * | 1/2000 | Maes et al. ..................... 705/1 |
| 6,084,967 | A | * | 7/2000 | Kennedy et al. ............ 380/247 |
| 6,111,517 | A | * | 8/2000 | Atick et al. ................. 340/5.83 |

FOREIGN PATENT DOCUMENTS

| DE | 3043097 | 7/1991 |
| JP | 08088841 | 4/1996 |
| WO | 96/18169 | 6/1996 |
| WO | 98/18169 | 6/1996 |
| WO | 98/11750 | 3/1998 |

OTHER PUBLICATIONS

Patent Abstracts of Japan vol. 096, No. 008, Aug. 30, 1996 & JP 08 088841 A ( Ado Maniyuaru:KK), Apr. 2, 1996.

* cited by examiner

Primary Examiner—Michael Horabik
Assistant Examiner—Yves Dalencourt
(74) Attorney, Agent, or Firm—Pillsbury Winthrop LLP

(57) ABSTRACT

In a method for authenticating persons, video information of certain body features associated with a user or a user group is recorded in a point of presence (POP). Such recorded video information is processed to derive biometric keys, which are stored in tables of a biometric server and in a SIM-card of the user. Each biometric key in the tables is assigned to a respective user. When the user inserts the SIM-card containing a personal biometric key into a communication terminal device, video information describing current body feature of the user is recorded via a video sensor that is not in the communication terminal device. The recorded current video information is then transmitted from the video sensor to the communication terminal device. To authenticate the user, the recorded current video information is processed to derive current biometric keys and compared with pre-stored biometric keys. The authenticity of the user is ensured if the comparison yield a positive result.

23 Claims, 1 Drawing Sheet

METHOD, SYSTEM AND DEVICES FOR AUTHENTICATING PERSONS

Figure 1:
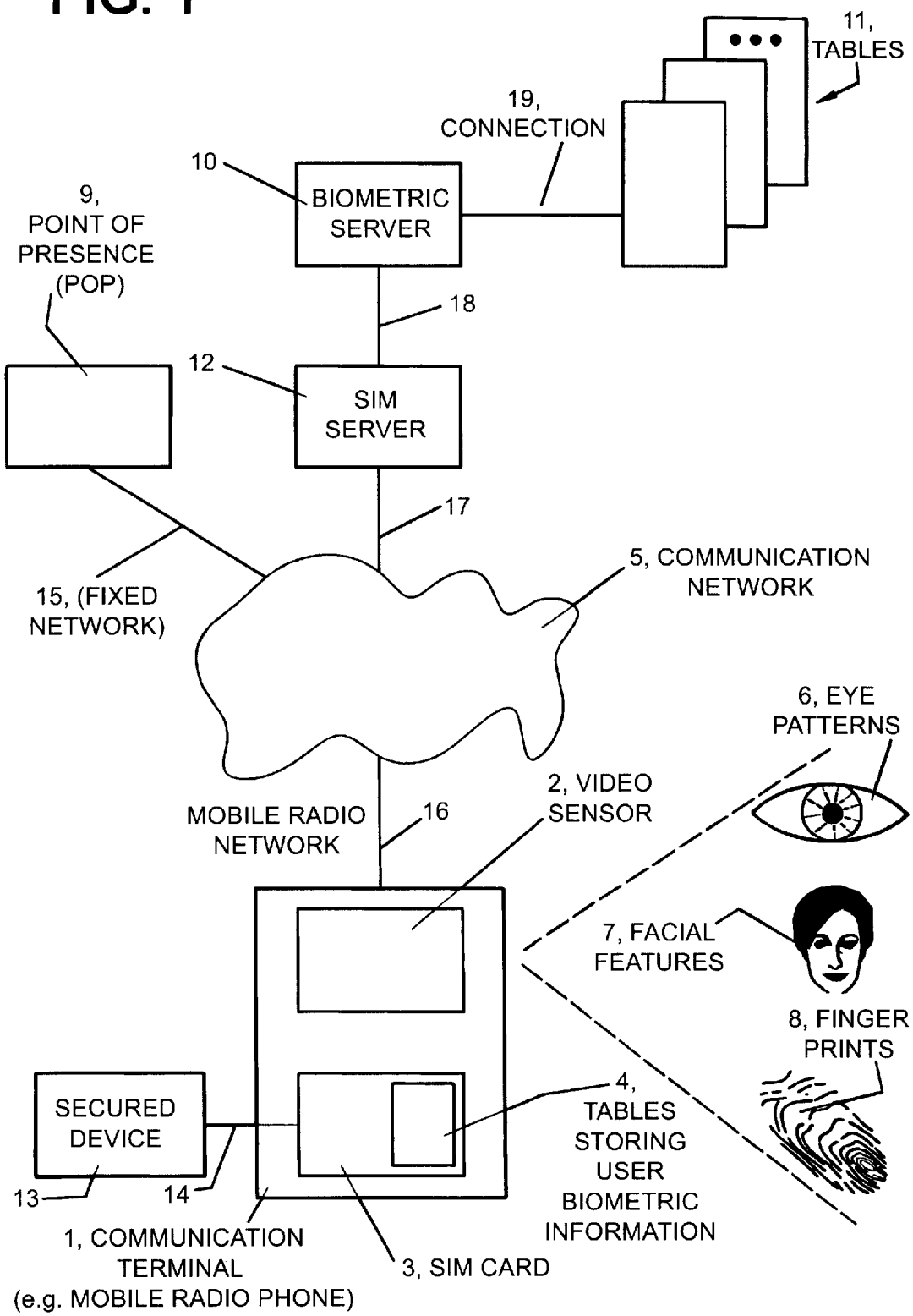

This application is the national phase of international application PCT/CH97/00424 filed Nov. 7, 1997 which designated the U.S.

The present invention relates to a method, a system and devices for determining the authenticity of a user or a group of users of a communication terminal device.

Aside from conventional methods for authenticating persons by means of photographs and personal identification papers, methods for authenticating persons by means of biometric features are also known in the prior art. In these methods, measurable and recordable body features are registered as biometric keys and, at the time of authentication, compared with the respective body features of a person to be authenticated. Known examples of such biometric features include fingerprints, eye patterns, facial contours, or voice characteristics.

It is also known that a personal computer (PC) can be equipped with means, an external video camera among others, which make it possible for the PC to record in a learning process and to reuse at a later point in time for authentication purposes the face, respectively some facial features, of a user, the PC granting the user access to the PC only if it recognizes the facial features.

The combination of video sensors with communication terminal devices is known in the context of video telephony, which is also available in a mobile version where a video camera is connected to a mobile radio telephone.

A method is described in DE 39 43 097 A1 which transfers biometrically measurable data, such as an eye pattern or a fingerprint, as search criteria over communication networks, among others by means of a mobile telephone, for retrieving stored medical data. Essentially, in this method, an individual is identified by means of biometric features in order to access his medical data. However, it is not the intention of this method to verify the authenticity of this individual nor to ensure the authenticity and the non-deniable origin of the data exchanged over the communication network in this method.

It is the object of this invention to propose a new and improved method and system for determining the authenticity of a user or of a group of users of a communication terminal device.

According to the present invention, body features are stored in a secured way as biometric keys on a personal SIM-card and in that this SIM-card is inserted into a communication device by a user, said device determining current body features from the user, determining current biometric keys therefrom, and comparing these with the biometric keys stored on the card in order to authenticate the user. This has the advantage that a personal card can authenticate the user in different communication terminal devices without the user having to use passwords, which are often forgotten or may be entered unlawfully, and that a user who acquired the SIM-card improperly, for instance through theft or accidental finding, is not authenticated. An additional advantage is the fact that the SIM-card can be prepared for a user group in that biometric keys are stored therein for all users belonging to the group.

In order to prevent improper authentication, for instance through photographic imitation of body features, body movements are included in the biometric keys.

According to the invention, authentication of the user through the communication terminal device can be used to allow or refuse a user the usage of the communication terminal device in correspondence with the result of the authentication. According to the invention, the result of the authentication can also be transmitted in a wireless manner, particularly by a mobile communication terminal device, to an external secured device which, for its part, can permit or refuse the user access to its services or buildings.

According to the invention, the first recording of biometric keys is executed in a point of presence (POP) connected to a communication network. From there, they are transmitted in a secured manner via the communication network to a biometric server where they are stored in tables, at least one biometric key in a table being assigned to a corresponding user. Additions to and updating of biometric keys can also be executed in the POP. Moreover, with the present invention, it is possible to update biometric keys directly from the communication terminal device, provided that for the respective user there is already a plurality of biometric keys known at the biometric server.

In the present invention, for the authentication and for the transmission of biometric keys, security services are preferably used, for example Trusted Third Party (TTP) services, in order to ensure the confidentiality, authenticity, integrity and non-deniable origin of the data exchanged via a communication network as well as the authenticity of the sender of these data thereby exchanged.

In the following one embodiment of the present invention is described by way of example. The embodiment example is illustrated by means of the following appended FIGURE:

FIG. 1 shows a block diagram comprising a communication network and, connected to it, a mobile communication terminal device with a SIM-card and a video sensor, a biometric server with connected tables and SIM-server, and a point of presence, as well as a secured device.

The reference numeral 9 refers to a point of presence (POP), for instance connected to a point of sale of a network operator or of a service provider company. The point of presence 9 is provided with at least one computer which, for instance, also serves as communication terminal device, preferably a personal computer or a work station connected to a communication network 5, for instance a fixed network 15. In addition, the point of presence 9 is provided with peripherals for recording body features, which peripherals are connected to the computer and are not illustrated, for instance a video camera connected to the computer via a video cable and a video interface card. The computer is provided with a program which can access and control the peripheral devices and particularly read, temporarily store and process data recorded by the peripheral devices. The program is also provided with a user interface by means of which it can be used, for example by an operator who is an employee of the POP 9. The user interface helps the operator to record the body features of a client, for example his facial features 7, eye patterns, or fingerprints 8, by providing modules known to one skilled in the art, for example modules to adjust the video camera, to adjust the contrast, to appropriately display picture segments, and also to indicate to the operator when the biometric keys derived by the program are completed, after the program has checked them on site for authentication purposes with the assistance of the client.

Particularly for recording body movements, it is necessary that the program provides the client and the operator via the user interface with instructions, for example to execute certain specific movements, such as mouth or eye movements, for example. At this point, it is important to mention that in an embodiment variant the user interface can be fully automated for recording biometric keys, without the need for an operator, but by giving instructions directly to the client. In such an embodiment variant, the computer and its screen and the camera may be arranged in a manner similar to the one known from automatic passport photo machines or automatic teller machines.

Aside from visual biometric keys, voice features can be recorded correspondingly, by means of peripheral devices, such as microphones and audio interface cards, and can be stored as biometric keys.

The recorded and derived biometric keys of a client can be stored in a corresponding personal user profile; they can also be assigned to a user group. The program and its user interface are provided with the respective components, which can be implemented easily by one skilled in the art, for recording related personal data and for storing this data in respective user or user group profiles. Moreover, additional security information, such as security levels, for example, can also be recorded. Security levels can be used, for instance, to divide secured devices 13 into different levels of access rights to different services, for example, the access rights of a user may be limited to conduct conversations via the mobile radio telephone 1, whereas another user may execute in addition also other functions, such as selecting and executing special services via the mobile radio telephone 1. Other examples for additional security information, which can be entered and stored, include information relating to the duration of validity, for example in order to limit the validity of certain rights to a specific duration of time or point in time, location information, for example in order to limit access rights to devices or services to specific geographic areas, or personal passwords.

In order to prevent improper assignments, it is important that the assignment of the biometric keys to a user profile or to a user group profile is handled in a controlled manner, for instance exclusively by an operator, under strict authentication conditions, for example by means of multiple identification papers with photographs and possibly with confirming testimony from a present third party.

For completing the recording of the biometric keys, the user profiles or user group profiles with the biometric keys and the security information are transmitted by the program of the computer in a secured manner via a communication network 5 to a server for maintaining the biometric keys, in the following paragraphs referred to as biometric server 10, where they are stored for the respective user or user group in tables 11, connected 19 to the biometric server 10. For one skilled in the art it is clear that there are different possibilities for implementing the biometric server 10 with the tables 11. For example, the tables 11 can be located in a database server which is located on a computer together with the biometric server or which is located on another computer connected to the computer of the biometric server 10 via a communication network. For one skilled in the art, there are also different variants for storing the information in the tables 11, which will not be gone into in more detail here. The same information is likewise stored on the personal SIM card 3 of the user, preferably a GSM card, or on possibly several SIM cards 3 of a user group in corresponding tables 4, in that it is transmitted by the POP 9 to a SIM-server 12, and from there, according to the SICAP method described in EP 0 689 368 B1, by means of special short messages via a mobile radio network, for instance according to the GSM standard, to the SIM card, and is stored there. In another variant, the SIM-cards 3 are inserted in a special interface (which is not illustrated) of the respective computer in the POP 9 and the program stores the information in a secured manner in the table 4. Thereafter, the SIM-cards, which are thus personalized, can be passed to its user or its user group.

For a secured transmission and storage of biometric keys, security services, for instance trusted third party (TTP) services, are preferably used to ensure the confidentiality, the authenticity, the integrity and the non-deniable origin of this transmitted data. It is also thoroughly possible to execute the encryption by means of a point-to-point method.

Moreover, it is also possible to offer further services in the POP 9, particularly services for updating biometric keys, for instance because of changes due to aging, or services for completing or adding additional biometric keys or other security information, which further services can be implemented by one skilled in the art according to the above descriptions.

The user can insert his personal SIM-card 3 in a communication terminal device 1 and turn on the device. In this example, the communication terminal device 1 is a mobile radio telephone, which is equipped with a video sensor 2 for recording body features, such as eye patterns 6, facial features 7, or fingerprints 8, for example. The video sensor 2 can be directly built into the mobile radio telephone 1 or it can be inserted into the SIM-card 3 interface of the mobile radio telephone 1 by means of an adapter, which itself may comprise an interface for receiving a SIM-card 3. After turning on the mobile radio telephone 1, an authentication program is started, which may be located in the SIM-card 3, for instance, and the user is requested, for example by means of the display (not illustrated) of the mobile radio telephone 1, to look into the video sensor 2, to put a specific finger onto the video sensor 2 and/or to talk into the mobile radio telephone 1. The data recorded by means of the video sensor 2 and, if applicable, by means of the microphone (not illustrated) of the mobile radio telephone 1, is temporarily stored by the authentication program. From this data, current biometric keys are derived which are temporarily stored and compared to the stored biometric keys 4. In addition to this direct comparison, the authenticity and the integrity of the stored biometric keys 4 can be confirmed by means of TTP services by the biometric server 10, for example. If the comparison of the current biometric key to the biometric key 4 stored in the SIM-card 3 turns out to be positive and if the stored biometric keys 4 are authenticated positively by the biometric server 10, further usage of the mobile radio telephone 1 may be permitted, for example. Otherwise, further usage of the mobile radio telephone 1 by this user may be prevented and the mobile radio telephone 1 may be turned off, for example. Permission may be sustained until the mobile radio telephone 1 is turned off again or it may be time limited, in that the user has to be authenticated again after a predefined period, this may be executed automatically during usage of the mobile radio telephone 1, for example.

Preferably, the SIM-card 3 communicates with the biometric server by means of special short messages which are transmitted via a mobile radio network 16, for instance according to the GSM-standard, within the communication network 5, to a SIM-server 12. Said SIM-server 12 is connected to the communication network 5 via the connection 17 and forwards these special short messages, according to the SICAP method described in EP 0689 368 B1, for further processing to the biometric server 10 via the connection 18.

In the case where a plurality of biometric keys 11 of the user are known at the biometric server 10, it is possible to update biometric keys 11, which have changed, for instance, due to aging, directly from the mobile radio telephone 1. This can take place on condition that the user was authenticated through at least a second biometric key which does not need to be changed and that the quality of the video information to be used for updating a first biometric key meets predefined minimum requirements. For example, these requirements may be requirements on minimum light conditions or image contrast or requirements on the maximum deviation of the new biometric keys from the old biometric keys.

In a variant, the authentication is not primarily used to control usage of the mobile radio telephone 1, but the result of the authentication according to the description above is transmitted in a wireless and secured manner to an external secured device 13, which on its part permits or refuses the access to the device 13 accordingly. Together with the result of the authentication, personal data of the authenticated user may also be transmitted to the secured device 13 so that the secured device 13 may permit or refuse access on the basis of this personal data. In another variant, additional security information of the user, such as security levels, location information, and information about the duration of the validity, for example, is transmitted to the secured device 13 together with the result of the authentication. Based on this security information, the secured device 13 may make the decision about permitting or refusing access. In another variant, the secured device 13 transmits, on request, information about its identity to the mobile radio telephone 1. With this information and by means of additional security information of the user, such as security levels, location information, and information about the duration of the validity, for example, the mobile radio telephone 1 may also make decisions during the authentication process about the user's access to the respective secured device 13 and transmit the result to the secured device 13. For example, the external secured device 13 is an apparatus, for instance an automatic teller machine or a video terminal for information inquiries, an entrance to a secured building, such as a secret industrial manufacturing installation, a police headquarter, or a nuclear power plant, for instance, or the entrance to a restricted area, such as an army base, an airport or a factory, for example. The wireless transmission can be performed, for example, in a contactless manner via an inductive interface 14 by means of an electromagnetic coil located in the SIM-card 3. The mobile radio telephone 1 can also perform the transmission to the secured device 13 by means of a contactless infrared interface (not illustrated) or by means of short messages. The respective transmission takes place in a secured manner, for example by using TTP services or by means of a point to point method.

In a further variant, the video sensor is located outside the mobile radio telephone 1, for example in the external secured device 13. In this variant, the video information is recorded by the external video camera and transmitted to the mobile radio telephone for evaluation. The wireless transmission may be performed, for example, in a contactless manner via an inductive interface 14 by means of an electromagnetic coil located in the SIM-card 3. The secured device 13 may also perform the transmission to the mobile radio telephone 1 by means of a contactless infrared interface (not illustrated) or by means of short messages. The respective transmission takes place in a secured manner, for example by using TTP services or by means of a point to point method.

Here too, it must be mentioned that, aside from mobile radio telephones 1, other communication terminal devices, such as personal computers, laptop computers, or palmtop computers, for example, may execute this authentication method, if they are equipped with a SIM-card 3 and with peripheral devices for recording body features. Moreover, the application of the authentication does not need to be restricted to access control for communication terminal devices or external secured devices 13, but may also be perfectly well applied to controlling access to services, particularly to services available via the communication network 5, which may comprise the Internet. In these cases, the result of the authentication is transmitted to the respective service provider, for instance an automated Internet site, which can permit or refuse services accordingly. Possibly, the result of the authentication is transmitted to the service provider together with information about the user's access rights to the respective services or with personal data of the user, as was described above in connection with secured devices 13.

It is thoroughly possible that this method and system may be offered by a service provider as a payable service to third parties, who may be interested, for example, in protecting their devices, buildings, areas, or services.

What is claimed is:

1. A method for determining the authenticity of a user or a user group of a communication terminal device, comprising:
   recording video information of body features associated with said user or said user group in a point of presence (POP);
   processing said video information to derive specific features as biometric keys;
   storing said biometric keys in tables of a biometric server and in a SIM-card of said user or said user group, at least one of said biometric keys being assigned in a table to a respective user;
   inserting said SIM-card into a communication terminal device by said user, said SIM-card containing at least one personal biometric key;
   recording current video information of at least one body feature associated with said user via a video sensor located outside said communication terminal device, wherein said current video information is transmitted from said video sensor to said communication terminal device for further processing;
   processing said current video information to derive at least one specific feature as a current biometric key;
   determining the authenticity of said user by comparing said current biometric key of said user to said stored biometric keys, wherein the authenticity is ensured if the comparison is positive and the authenticity is not ensured if the comparison is negative.

2. The method according to claim 1, wherein said video sensor further registers movement which is used in said determining the authenticity.

3. The method according to claim 1, wherein said SIM-card is capable of storing said current video information, processing said current video information to derive current biometric keys, and determining the authenticity of said user by comparing said current biometric keys with said stored biometric keys.

4. The method according to claim 1, wherein secure Trusted Third Party (TTP) services (TTP services) are used to transmit at least certain messages to ensure confidentiality, authenticity, integrity and non-deniable origin of the data exchanged via a communication network as well as the authenticity of the sender of the data thereby exchanged.

5. The method according to claim 1, wherein said TTP services record additional security information in said POP and store said additional security information in tables of said biometric server and in said SIM-card, said additional security information being assigned to respective users or user groups in said tables and being used in said determining the authenticity.

6. The method according to claim 5, wherein said additional security information comprises security levels.

7. The method according to claim 5, wherein said additional security information comprises information about the duration of validity.

8. The method according to claim 5, wherein said additional security information comprises location information.

9. The method according to claim 5, wherein said additional security information comprises passwords.

10. The method according to claim 1, wherein existing information associated with respective users or user groups can be updated in said POP via said TTP services.

11. The method according to claim 1, wherein said biometric keys stored in said tables of said biometric server and in said SIM-card of a communication terminal device can be updated directly from said communication terminal device via said TTP services.

12. The method according to claim 1, wherein said biometric keys include facial features.

13. The method according to claim 1, wherein said biometric keys include eye patterns.

14. The method according to claim 1, wherein said biometric keys include fingerprints.

15. The method according to claim 1, wherein said biometric keys further include, in addition to visual features, recorded voice features.

16. The method according to claim 1, wherein a video sensor located in said communication terminal device records said current video information.

17. The method according to claim 1, wherein said current video information is transmitted to said communication terminal device by induction via a coil in a SIM-card.

18. The method according to claim 1, wherein said current video information is transmitted to said communication terminal device by means of infrared.

19. The method according to claim 1, wherein said current video information is transmitted to said communication terminal device by means of short messages.

20. The method according to claim 1, wherein said current video information is transmitted to said communication terminal device using said TTP services.

21. The method according to claim 1, wherein communication between said SIM-card in said communication terminal device and said biometric server is conducted by means of special messages via a SIM server.

22. The method according to claim 1, wherein a user is permitted to use said communication terminal device if the authenticity of said user is ensured and said user is not permitted to use said communication terminal device if the authenticity of said user is not ensured.

23. The method according to claim 1, wherein said video information is transmitted from said video sensor to said communication terminal device through wireless transmission.

* * * * *